United States Patent [19]
Bernauer et al.
[11] Patent Number: 4,717,551
[45] Date of Patent: Jan. 5, 1988

[54] TITANIUM-BASED ALLOY USED AS A GETTERING MATERIAL

[75] Inventors: Otto Bernauer, Weinstadt; Klaus Ziegler, Ostfildern, both of Fed. Rep. of Germany

[73] Assignee: Daimler-Benz Aktiengesellschaft, Fed. Rep. of Germany

[21] Appl. No.: 751,972

[22] Filed: Jul. 5, 1985

[30] Foreign Application Priority Data

Jul. 7, 1984 [DE] Fed. Rep. of Germany ....... 3425055

[51] Int. Cl.[4] .................................... B01D 53/34

[52] U.S. Cl. .................................... 423/219; 423/248; 252/181.6; 55/68

[58] Field of Search ...................... 252/181.6; 420/418, 420/420, 421, 900, 424; 55/68, 31, 74; 423/219, 248

[56] References Cited

U.S. PATENT DOCUMENTS

| | | | |
|---|---|---|---|
| Re. 30,083 | 8/1979 | Reilly et al. | 420/900 X |
| 3,005,698 | 10/1961 | Tao | 420/900 X |
| 3,627,521 | 12/1971 | Vordahl | 252/181.6 X |
| 3,992,685 | 11/1976 | Ogren et al. | 252/181.6 X |
| 4,069,303 | 1/1978 | Yamadaya et al. | 420/900 X |
| 4,111,689 | 9/1978 | Liu | 420/900 X |
| 4,154,364 | 5/1979 | Hagiwara et al. | 220/422 |
| 4,278,466 | 7/1981 | de Pous | 420/900 X |
| 4,358,316 | 11/1982 | Liu et al. | 420/900 X |
| 4,360,445 | 11/1982 | Mendelsohn et al. | 252/181.6 |
| 4,397,834 | 8/1983 | Mendelsohn et al. | 423/644 |
| 4,440,736 | 4/1984 | Maeland et al. | 252/181.6 X |
| 4,446,101 | 5/1984 | Bernauer et al. | 420/900 X |

FOREIGN PATENT DOCUMENTS

| | | | |
|---|---|---|---|
| 2117002 | 10/1983 | United Kingdom | 423/648 R |
| 2123805 | 2/1984 | United Kingdom | 252/181.6 |

OTHER PUBLICATIONS

Mendelsohn et al., "Intermetallic Alloys as Bulk Getters" *Proc. Intl. Symp. on Properties & Applications of Metal Hydrides*, Colorado Springs, Co., Apr. 7-11, 1980.

Boffito et al., "A Nonevaporable Low Temperature Activatable Getter Material", *J. Vac. Sci. Technol.*, 18(3), Apr. 1981, pp. 1117-1120.

*Primary Examiner*—Matthew A. Thexton

[57] ABSTRACT

The use of an alloy of the formula $$Ti(V_{l-a-b}Fe_aAl_b)_xCr_yMn_z$$

where x=greater than 1. to 2
y=0 to 0.2
x+y=at most 2
a=0 to 0.4
b=0 to 0.2
a+b=at most 0.5
(l−a−b).x=at least 1
Z=0 to (2−x−y)

as a getter material. The alloy is distinguished by a low activation temperature, favorable mechanical properties and inexpensiveness.

4 Claims, No Drawings

TITANIUM-BASED ALLOY USED AS A GETTERING MATERIAL

Getter materials have been used for many years in industry and in the laboratory, for example for absorbing harmful residual gases from vacuum pipes, apparatus filled with noble gas, vacuum systems and the like. For these applications it is frequently necessary to activate the getter material at relatively low temperatures (ideally below 500° C.) in order to avoid harmful thermal effects on the housing walls.

The customarily used getter materials made of zirconium or zirconium-aluminium alloys require activation temperatures of 700°-900° C. and, in the most favorable case, of only partial activation, of about 500°-700° C.

It is therefore the object to provide getter material which has good soption properties and can be activated at very low temperatures.

It is an object of the invention to provide for use as a getter material an alloy of the formula $$Ti(V_{1-a-b}Fe_aAl_b)_xCr_yMn_Z$$

where x=greater than 1. to 2
y=0 to 0.2
x+y=at most 2
a=0 to 0.4
b=0 to 0.2
a+b=at most 0.5
(1-a-b).x=at least 1
Z=0 to (2-x-y)

The alloys are prepared in a manner known per se by melting together the alloy constituents or appropriately selected prealloys under protective gas, by first of all in a manner known per se preparing a melt from the higher-melting constituents and then adding the lower melting constituents, in order to minimize the rates of evaporation. To reduce the oxygen content of the alloy, the melt is then deoxidized in conventional manner by addition of known deoxidizing agents, lanthanum, misch metal and the like.

The solidified melt is then pulverized under protective gas. The alloy is capable of absorbing large amounts of hydrogen at about room temperature and of rereleasing the amounts at temperatures of about 100°-150° C. This absorption-desorption process leads to a comminution of the alloy particles, so that by repeatedly loading and unloading the alloy with hydrogen the particle size of the alloy can be reduced to less than 1 um. The resulting large surface area combined with short diffusion paths is responsible for a particularly powerful absorption effect per gram of the getter material.

The getter material can likewise be activated by loading and unloading the alloy with hydrogen, for example by introducing the hydrogen-loaded getter material into the operating space and then removing the hydrogen by pumping at moderate temperatures between room temperature and about 150° C., exceptionally however at even higher temperatures. The getter material thus activated has an excellent absorption capacity for nitrogen, water, oxygen, carbon oxides, hydrogen and the like. For some purposes, however, it is also possible to use the hydrogen-loaded getter material, for example if the release of small amounts of hydrogen is not critical or the operating atmosphere is $H_2$, since the absorption capacity for the other gases is barely affected by the hydrogen content, if at all. Alloys which have been found to be particularly suitable are alloys of the formula $TiV_{1.8}Fe_{0.2}$, $TiV_{1.6}Fe_{0.2}Mn_{0.2}$ and in particular $TiV_{1.6}Fe_{0.4}$, $TiV_{1.5}Fe_{0.4}Mn_{0.1}$, and $TiV_{1.6}Fe_{0.2}Cr_{0.1}Mn_{0.1}$.

The greater material described have remarkably low absorption pressures of less than $10^{-6}$ mbar and are frequently within the order of $10^{-7}$-$10^{-8}$ mbar. In addition to the good absorption capacity, the low activation temperature and the simple comminutability of the alloy, there is an additional special advantage in that the getter materials are particularly inexpensive to prepare, for example using inexpensive ferrovanadium.

While we have shown and described plural embodiments in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. The method of absorbing a plurality of different gases using a gettering material comprising an alloy of the formula $$Ti(V_{1-a-b}Fe_aAl_b)_xCr_yMn_Z$$

where x=greater than 1. to 2
y=0 to 0.2
x+y=at most 2
a=0 to 0.4
b=0 to 0.2
a+b=at most 0.5
(1-a-b).x=at least 1
Z=0 to (2-x-y)

by contacting said different gases with the getter material.

2. The method of claim 1, wherein the alloy is characterized by the formula $$TiV_{1.5}Fe_{0.4}Mn_{0.1}.$$

3. The method of claim 1, wherein the alloy is characterized by the formula $$TiV_{1.6}Fe_{0.4}.$$

4. The method of claim 1, wherein the alloy is characterized by the formula $$TiV_{1.6}Fe_{0.2}Cr_{0.1}Mn_{0.1}.$$

* * * * *